United States Patent [19]

Rayner

[11] 3,716,241

[45] Feb. 13, 1973

[54] DRIVE APPARATUS FOR TAPE PLAYBACK APPARATUS

[75] Inventor: Wilfred H. G. Rayner, London, England

[73] Assignee: Clarke and Smith Manufacturing Company Limited

[22] Filed: April 9, 1970

[21] Appl. No.: 26,901

[30] Foreign Application Priority Data

April 11, 1969 Great Britain ..................... 18,762/69

[52] U.S. Cl. ..................... 274/4 D, 242/201, 274/4 R

[51] Int. Cl. ......................... G11b 15/44, G11b 27/00

[58] Field of Search ....... 242/201, 202, 207; 274/4 R, 274/4 D, 11 D, 11 E; 35/35 C; 179/100.2 R

[56] References Cited

UNITED STATES PATENTS

| | | | |
|---|---|---|---|
| 2,864,894 | 12/1958 | Dale | 274/4 D X |
| 2,912,179 | 11/1959 | Schuyler | 242/201 X |
| 2,920,148 | 1/1960 | Monroe | 274/11 D X |
| 2,933,319 | 4/1960 | Proctor | 274/4 R X |

FOREIGN PATENTS OR APPLICATIONS

| | | | |
|---|---|---|---|
| 35,631 | 1/1969 | Germany | 274/4 D |

*Primary Examiner*—Leonard Forman
*Assistant Examiner*—Dennis A. Dearing
*Attorney*—Lawrence E. Laubscher

[57] ABSTRACT

In a tape recording and playback machine for language teaching or for a dictation system, the tape can be fed at both fast and slow forward and reverse speeds. Sound recorded on the tape can be reproduced during slow reverse winding as well as slow forward winding. The drive shift mechanism can be controlled by solenoids, remotely or at the machine.

7 Claims, 2 Drawing Figures

WILFRED H.G. RAYNER
INVENTOR

BY

Lawrence E. Laubscher
ATTORNEY

WILFRED H. G. RAYNER
INVENTOR

BY
Lawrence E. Laubscher
ATTORNEY

DRIVE APPARATUS FOR TAPE PLAYBACK APPARATUS

BACKGROUND OF THE INVENTION

This invention relates to tape playback apparatus, by which is meant apparatus which may be used to reproduce or "play back" a recording of sound on a tape. The apparatus may also be capable of recording sound on the tape.

PRIOR ART

Known apparatus of this kind is capable of passing the tape over one or more transducer heads in a "forward" direction to record or play back the sound. Often more than one forward speed is provided, for example to accommodate different recording speeds. Also, provision is often made for feeding the tape in the forward or reverse direction at much higher speeds, usually with the tape spaced from the transducer heads, to reach a desired point on the tape quickly. A tape position indicator may be provided to indicate the approximate position of the tape, but it remains difficult to stop the tape precisely at a desired point. The present invention alleviates this problem.

SUMMARY OF THE INVENTION

The present invention provides tape playback apparatus for receiving a length of tape having sound recorded thereon and wound in two reels, and comprising at least one transducer head for connection to an audio output system for producing sound in response to signals from said playback head, and tape drive means for feeding the tape between the reels past said playback head, said tape drive means being selectably operable to feed the tape at at least one playback speed in a forward direction for normal playback of the sound recorded on said tape, to feed the tape in said forward direction at a fast forward speed substantially higher than said playback speed, and to feed the tape in the reverse direction at a fast reverse speed substantially higher than said playback speed and at a slow reverse speed substantially lower than said fast reverse speed.

The tape can now be moved to the desired position at the slow forward or reverse speeds, and stopped precisely at the desired position.

Preferably the playback transducer head can be connected to the audio output system while the tape is moving at either the slow forward or the slow reverse speed, and the tape fed sufficiently close to the playback head to reproduce sound from a recording on the tape. This enables the position of the tape to be judged by listening to the recording.

DESCRIPTION OF THE DRAWINGS

Other features and advantages of the invention will appear from the following description of the embodiment thereof given by way of example with reference to the accompanying drawings, in which.

Figure 1:
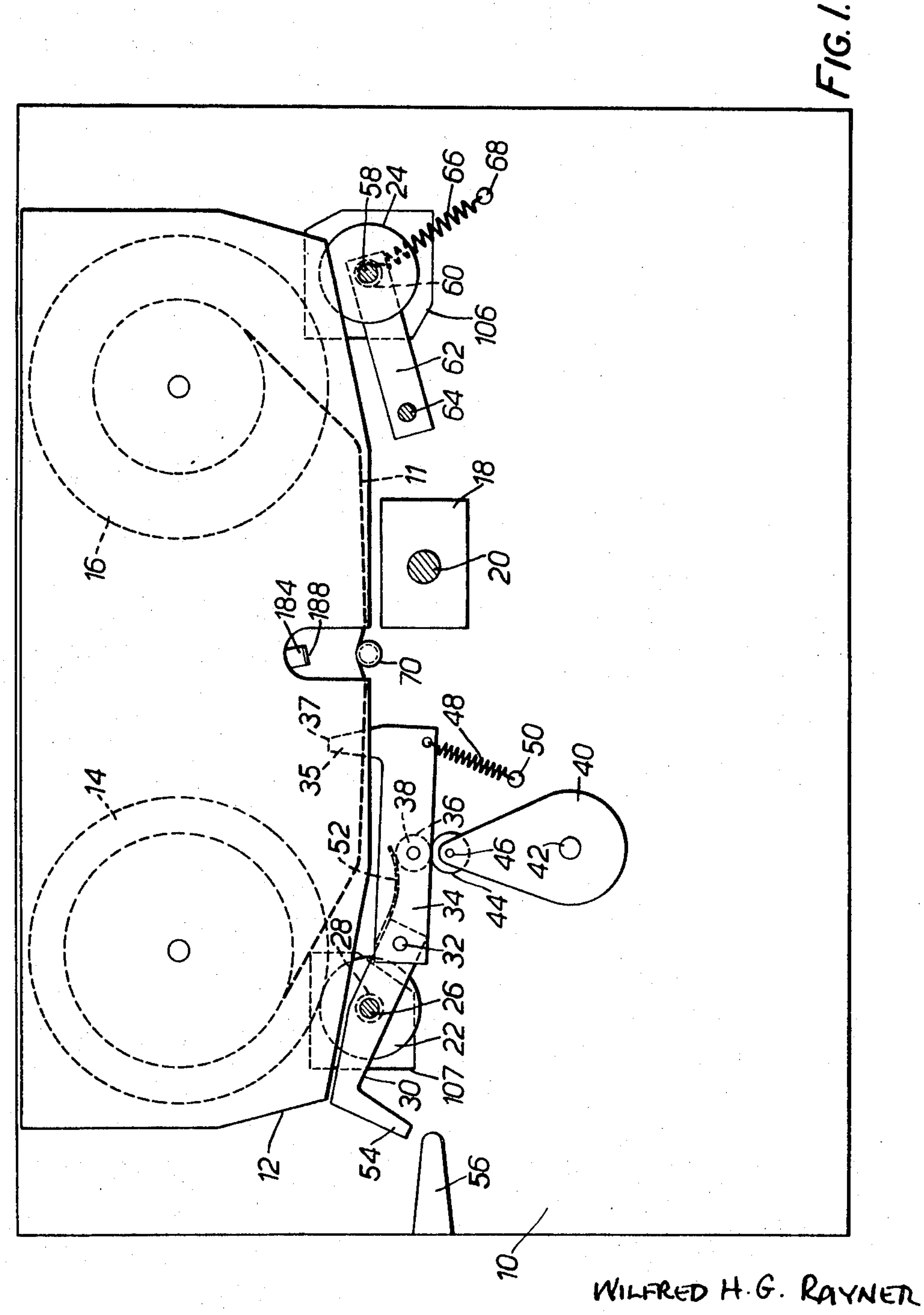
FIG. 1 is a simplified plan view of the tape-deck of a tape playback apparatus, showing those components of a drive apparatus in accordance with the invention which lie on the upper side of a tape-deck.

The drawings show drive apparatus for feeding magnetic tape 11 past a transducer head 18 of a tape playback apparatus, comprising means for feeding the tape in a forward direction selectively at relatively fast or slow speeds and for feeding the tape in the reverse direction selectively at relatively fast or slow speeds.

As shown in the drawings, the tape is fed between two spools 14 and 16, the tape being wound from the spool 16 on to the spool 14 to feed the tape in the forward direction, and being rewound from the spool 14 on to the spool 16 to feed the tape in the reverse direction.

The slow forward speed is used for recording sound upon the tape and for playing back the recording of sound on the tape. The fast forward and reverse speeds are used for feeding the tape rapidly to reach a desired point on the tape in a short time. However, when the tape is fed at the fast reverse speed, any sound reproduced by the transducer head 18 of the sound recorded on the tape is quite unintelligible even if it is audible. It is difficult to stop the tape accurately at any desired point judging from any tape position indicator. By feeding the tape at the relatively slow reverse speed, which may be the same as the slow forward speed or can be up to three times the slow speed used for recording but is preferably not higher, with the playback head connected to the audio amplifier and loudspeaker and with the tape sufficiently close to the head 18 to have sound reproduced, the pattern of the sound can be readily distinguished, and the tape can readily be stopped at or near a desired point judged by the sound reproduced. If speech is recorded on the tape, the tape can be stopped at or near the beginning of a phrase of the speech, for example.

The drive apparatus shown in the drawings may be used in the tape playback apparatus of a language laboratory. In a language laboratory a system of tape playback apparatuses is coupled to a common remote station controlled by the teacher. Each pupil sits at one of the tape playback apparatuses, and can listen to speech recorded as a sample in one track on the tape, for example by the teacher, and can record his own imitation of the sample in another track on the tape for example in intervals in the speech in the sample track. Sound can be recorded in this track, and previous recordings in this track erased without erasing the sample track or played back simultaneously with the sample. The teacher at the remote station can listen and speak to each pupil individually, and provision may also be made for the teacher to control from the remote station some or all of the operations of the tape playback apparatuses, particularly for instance fast tape spooling, both forward and reverse. The pupil may control the slow reverse feed for example to repeat a phrase just played back, or to find a desired point on the tape after fast spooling.

Also, the drive apparatus shown in the drawings may be used in a so-called language practice machine, which is a single tape playback apparatus basically similar to one of the tape playback apparatuses of the language laboratory system for a pupil to practice imitating the sample speech on his own. The slow reverse feed may again be used to advantage as in the language laboratory.

The feature of slow reverse feed also finds application in a centralized dictation system where a speaker has remote control over the tape deck recording his dictation. Particularly, if the control operates by dialling coded instructions over telephone lines, it may be difficult to run the tape back at the normal fast spooling speed and stop it accurately at a desired point, but the slow forward and reverse speeds can be used more easily.

In the drawings the tape-deck 10 forms part of a tape playback apparatus for a language laboratory. Tape-deck 10 is arranged on its upper side to receive and locate a cassette housing 12 containing the two freely rotatable tape spools 14, 16 holding reels of the tape. The transducer head 18 is situated on the upper side of the tape-deck, and includes transducers (not shown) for recording speech on to the tape and for reproducing sound recorded on the tape. Transducer head 18 is mounted on the upper end of a shaft 20 which passes through tape-deck 10. Apparatus (not shown) is mounted below tape-deck 10 for axially moving shaft 20 to alter the height of the transducer head 18. Transducer head 18 may thus be brought adjacent one or the other of two tracks on the tape, one track being used for recording a sample of speech and the other track being used for recording the pupil's imitation of the sample.

The drive apparatus for feeding the tape past the transducer head 18 includes two drive wheels 22, 24 drivable by a motor (not shown) which is mounted below the tape-deck. One or the other of drive wheels 22, 24 can be moved into driving engagement with the rim of its adjacent spool to wind the tape in one direction or the other.

Drive wheel 22 is mounted on a sleeve 28 which is mounted for rotation on a shaft 26. Shaft 26 is fixed at one end to an arm 30 which is pivoted at one end to a pin 32 attached to the upper side of tape-deck 10. An arm 34 is also pivoted, at one end, to pin 32. A nylon wheel 36 is mounted for rotation on a pin 38 fixed to arm 34. A crank 40 is fixed to the upper end of a shaft 42 which passes through and is journalled in tape-deck 10, and a nylon wheel 44 is mounted for rotation on a pin 46 fixed to crank 40. A coil spring 48 acts between the end of arm 34 remote from pivot pin 32 and a post 50 on the upper side of tape-deck 10 to urge arm 34 in the clockwise (as viewed in FIG. 1) direction of rotation about pin 32 so that wheels 38 and 44 may cam one against the other. A leaf spring 52 is attached to arm 30 and bears against wheel 38 to urge arm 30 in the counter-clockwise direction of rotation about pin 32. This counter-clockwise rotation of arm 30 is limited by the contacting of a cranked end portion 54 of arm 30 with an abutment 56 on tape-deck 10.

Drive wheel 24 is fixed to the upper end of a shaft 58 which is rotatable within a sleeve 60 fixed to an arm 62. Arm 62 is pivoted at one end to a pin 64 fixed to tape-deck 10 and a coil spring 66 acts between the other end of arm 62 and a post 68 on the tape-deck to urge arm 62 in a clockwise direction of rotation about pin 64.

Figure 2:
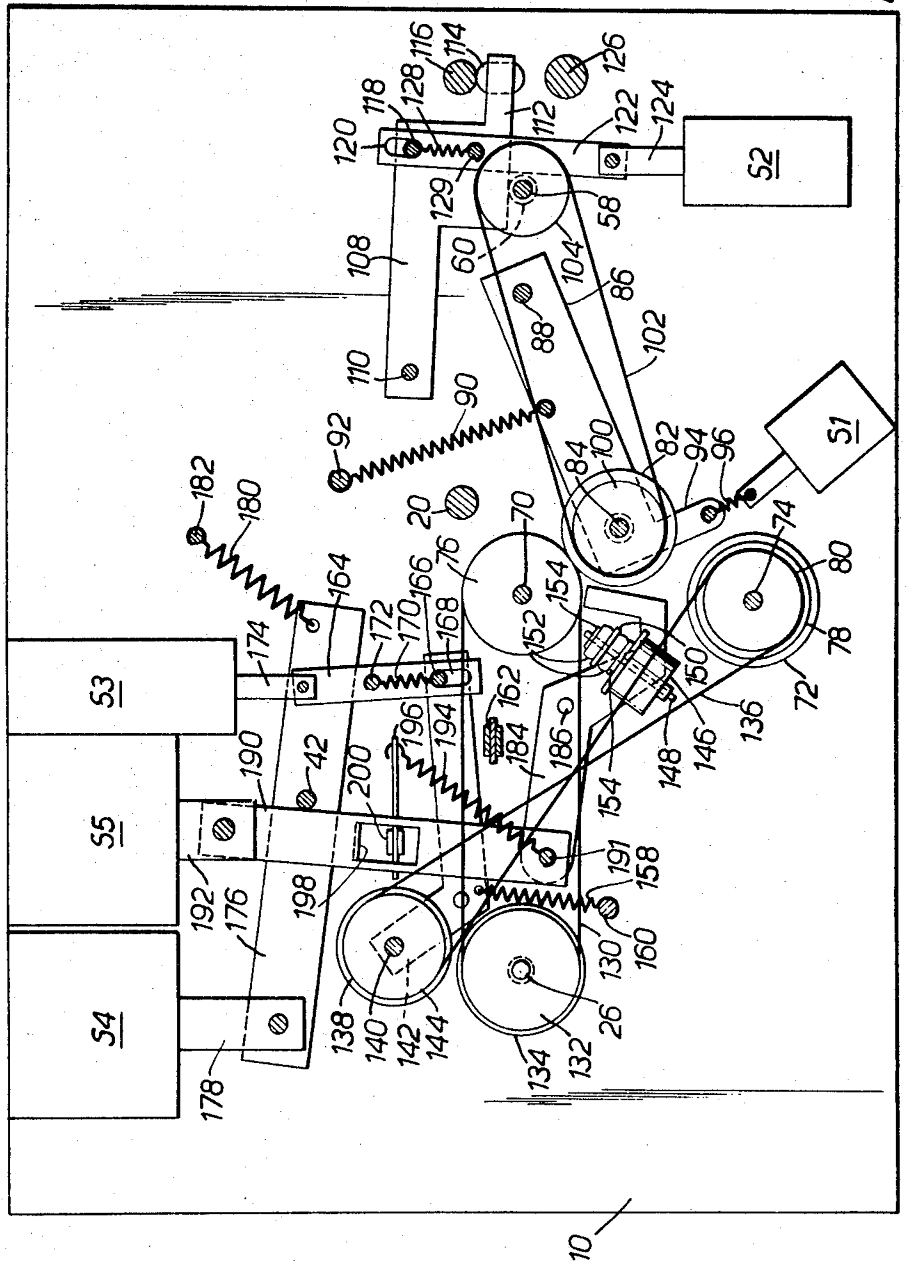
FIG. 2 is a simplified inverted bottom view of the underneath side of the tape-deck shown in FIG. 1, showing those components of the drive apparatus which lie underneath the tape-deck.

Referring now to FIG. 2, a motor (not shown) has an output shaft 70 which is journalled in tape-deck 10, and is continuously coupled to a pulley wheel 72 rotatable on a pin 74 fixed to tape-deck 10. Shaft 70 passes through tape-deck 10 and forms a capstan at its end above tape-deck 10 for engaging the tape while the tape is being wound in the forward direction at its slow speed. Shaft 70 bears a flywheel (not shown) and a pulley wheel 76 at its end below tape-deck 10. Drive from the shaft 70 to pulley wheel 72 is taken by a belt (not shown). A wheel 78 and a pulley wheel 80 are mounted integrally with pulley wheel 72 upon shaft 74.

A jockey friction wheel 82 is mounted for rotation on a pin 84 fixed to one end of an arm 86, the other end of which is pivoted about a pin 88 fixed to tape-deck 10. A coil spring 90 acts between a post 92 on tape-deck 10 and arm 86 to urge arm 86 in the clockwise direction (as seen in FIG. 2) of rotation about pin 88 so that friction wheel 82 bears against the rim of pulley wheel 76. A cranked end 94 of arm 86 is connected by way of a coil spring 96 to the armature of a solenoid S1. Pin 84 also bears a pulley wheel 100 connected by a sleeve 98 to friction wheel 82 so that pulley wheel 100 and jockey wheel 82 may rotate together. A belt 102 connects pulley wheel 100 to a pulley wheel 104 fixed to the lower end of shaft 58. Shaft 58 passes through an aperture 106 (see FIG. 1) in tape-deck 10.

An arm 108 is pivoted at one end to a pin 110 in tape-deck 10. Coil spring 66, in urging arm 62 in the clockwise direction as seen in FIG. 1, urges sleeve 60 to bear against a straight edge 112 on arm 108, hence urging arm 108 in the counter-clockwise (as seen in FIG. 2) direction of rotation about pin 110. Such rotation is limited by contact of a rubber stop 114 fixed to arm 108 with an abutment 116. A pin 118 fixed to lever 108 engages in a slot 120 at one end of an arm 122, the other end of which is pivoted to the armature 124 of a solenoid S2. Energization of solenoid S2, causing the attraction of armature 124 inwardly, causes clockwise rotation of arm 108 to move shaft 58 such that drive wheel 24 engages the rim of spool 16. This clockwise rotation of arm 108 is limited by rubber stop 114 contacting an abutment 126. A coil spring 128 acts between pin 118 and a post 129 on arm 122. The arrangement of pin 118, slot 120 and spring 128 provides for drive wheel 24 to bear resiliently against spool 16.

A belt 130 connects pulley wheel 76 to a pulley wheel 132 mounted for rotation on shaft 26 at the lower end thereof. Shaft 26 passes through an aperture 107 in tape-deck 10. A friction wheel 134 is fixed to the lower end of sleeve 28. A take-up clutch (not shown) is provided to transmit the rotation of pulley wheel 132 to friction wheel 134.

A belt 136 connects pulley wheel 80 to a pulley wheel 138 mounted for rotation on a pin 140 fixed to one end of a lever 142. A wheel 114 is also mounted on pin 140 and is integral with pulley wheel 138. To provide the correct sense of rotation of pulley wheel 138, belt 136 crosses itself at a point intermediate pulley wheels 80 and 138. So that the two straight runs of belt 136 do not interfere with each other at their cross-over, one of the runs engages a nylon wheel 146, resiliently mounted on the underside of tape-deck 10. Wheel 146 is rotatable on an axle 148 which passes through a support member 150 fixed to the underside of tape-deck 10. Axle 148 also passes through rubber washers 152 on either side of support member 150 and through metal washers 154 on the sides of rubber washers 152 remote from support member 150.

Lever 142 comprises two portions which lie at an obtuse angle to each other, and it is pivoted at the junction of its two portions to a pin 156 fixed to tape-deck 10. A coil spring 158 acts between lever 142 and a post 160 on tape-deck 10 to urge lever 142 in a clockwise direction of rotation about pin 156, as seen in FIG. 2. Such rotation of lever 142 is limited by a rubber stop 162 contacting lever 142. The end of lever 142 remote from shaft 140 is resiliently connected to one end of an arm 164, a pin 166 fixed to lever 142 engaging in a slot 168 in arm 164, and a coil spring 170 acting between pin 166 and a post 172 fixed to arm 164. The other end of arm 164 is pivoted to the armature 174 of a solenoid S3, such that energization of solenoid S3, attracting armature 174 into solenoid S3, causes lever 142 to rotate clockwise, moving wheel 144 into engagement with friction wheel 134 to press drive wheel 22 into engagement with spool 14. The resilient connection of lever 142 to arm 164 permits a resilient engagement of drive wheel 22 with spool 14.

The lower end of shaft 42 is fixed to an arm 176, one end of which is pivoted to the armature 178 of a solenoid S4. The other end of arm 176 is connected by way of a coil spring 180 to a post 182 on tape-deck 10 to urge arm 176 and shaft 42 in a counter-clockwise direction, as seen in FIG. 2, thus urging crank 40 in a clockwise direction as seen in FIG. 1. The clockwise rotation of crank 40 is limited, by an abutment within solenoid S4 limiting the length of armature 178 that may extend from solenoid S4, to such a position pin 46 lies close to the straight line joining shaft 42 and pin 38. In this position, arm 34 is rotated to a maximum extent in the counter-clockwise direction. A yoke (not shown) is mounted within cassette 12 and bears a pinch wheel (not shown), the yoke being resiliently loaded in the direction of the capstan on shaft 70 to press the tape into engagement with the capstan. With arm 34 rotated to its maximum extent in the counter-clockwise direction, end 37 of finger 35 of arm 34 bears against the yoke to push the pinch wheel away from the capstan, so that the tape remains out of engagement with the capstan.

A brake operating mechanism is also provided. The cassette 12 includes a brake (not shown) of the type described in co-pending application 47801/65. Thus, the cassette 12 includes brake shoes (not shown) biased into engagement with the edges of spools 14, 16. Depression of a bar (not shown) mounted within the cassette 12 releases the brake shoes. The brake operating mechanism comprises a lever 184 pivoted to a pin 186 on the underside of the tape-deck and having an upturned end 188 for engaging the end of the bar mounted in cassette 12.

The other end of lever 184 is pivoted at a pin 191 to one end of an arm 190. Arm 190 is pivoted at its other end to the armature 192 of a solenoid S5. End 188 of lever 184 is urged out of contact with the brake by a coil spring 194 acting between pin 191 and a flange 196 projecting downwards from the underside of tape-deck 10. Lever 190 has an upwardly bent finger 198 for abutting against a rubber stop 200 mounted on flange 196 when solenoid S5 is energized to move armature 192 outwardly therefrom. In the unenergized solenoid S3, end 188 depresses the bar in cassette 12, to release the brake. When solenoid S3 is energized, end 188 moves toward shaft 170 to release the bar and apply the brake shoes to spools 14, 16.

The operation of the drive apparatus will now be described. For slow forward drive, when speech is to be recorded upon the tape or a recording played back, solenoid S4 is energized, attracting armature 178 inwardly and causing clockwise rotation of arm 176 and shaft 42, as seen in FIG. 2. This results in a counter-clockwise rotation, as seen in FIG. 1, of crank 40. Wheels 36 and 44 cam against each other as arm 34 is now permitted to rotate clockwise under the force of spring 48, allowing the yoke bearing the pinch wheel in the cassette to move such that the pinch wheel bears on to the tape to press the tape against the capstan on shaft 70 (which is continuously driven in operation). The rotation of arm 34 causes rotation of arm 30 in a similar sense to press drive wheel 22 into engagement with spool 14. The drive is taken from the pulley wheel 76, by belt 130 to pulley wheel 132, and by the take-up clutch to friction wheel 134 and drive wheel 22.

For slow reverse drive, solenoid S2 is energized to attract its armature inwardly and rotate arm 108 to bear against sleeve 60 and hence press drive wheel 24 into engagement with spool 16. Drive is then taken from shaft 70 through pulley wheel 76, friction jockey wheel 82, pulley wheel 100, belt 102, pulley wheel 104 and sleeve 60 to drive wheel 24. Shaft 42 is not rotated, and the tape is not pressed against the capstan. The playback head is permanently connected to the audio output system while the tape is being fed, so that any signals produced by the playback head will be reproduced as sound by the audio output system. The tape need not be pressed against the playback head 18 during slow reverse feeding, since optimum quality and volume of reproduction are not required, but should run sufficiently close to the head for the head to pick up the signals from a recording on the tape, so that sound will be reproduced. This sound will usually be "-backwards" of course, and hence probably unintelligible, but the pattern of the sound will be recognizable. Also the reduced speed of the tape compared to normal spooling will enable the tape to stop within a shorter distance of a decision to operate the appropriate manual control to stop the tape.

For fast forward drive, solenoid S3 is energized to attract its armature 174 inwardly, rotating arm 142 and moving wheel 144 to bear against wheel 134. Shaft 26 is thus pressed sideways, rotating arm 30 about its pivot 32 against the bias of leaf spring 52, and pressing drive wheel 22 into engagement with spool 14. However, shaft 42 remains stationary and arm 34 is not allowed to rotate, so that the tape is not pressed into contact with the capstan. Drive is taken from pulley wheel 80 driven continuously by the motor at a faster rate than pulley wheel 76, through belt 136, pulley wheel 138, and wheels 144 and 134 to drive wheel 22. During this fast forward drive, wheel 134 is driven at a faster speed than pulley wheel 132. The difference in speed is accommodated by the clutch between wheel 134 and pulley wheel 132.

For fast reverse drive, solenoid S1 is energized, attracting its armature inwardly to rotate arm 86 so that jockey wheel 82 engages wheel 78 on shaft 74 (which is continuously driven in operation). Solenoid S2 is also energized to rotate arm 108 and press drive wheel 24 into engagement with spool 16. Drive is then taken from wheel 78 to jockey wheel 82 and through belt 102, pulley wheel 104 and sleeve 60 to drive wheel 24. Again shaft 42 does not rotate so that the tape is not pressed against the capstan.

I claim:

1. Tape playback apparatus for use in connection with a length of tape having sound recorded thereon and the ends of which are wound upon a pair of reels, respectively, comprising a. tape deck means (10) for rotatably supporting said reels and for guiding the tape therebetween;
b. transducer head means (18) supported on said tape deck adjacent said tape for connection with an audio output system to produce sound in response to signals detected on said tape;
c. tape drive means (22, 24) for alternately driving said reels to selectively wind said tape from one reel upon the other, said tape drive means including
   1. normally de-activated low forward speed drive means (76, 130, 132) for feeding the tape at at least one playback speed in a forward direction for normal playback of the sound recorded on said tape;
   2. normally de-activated high forward speed drive means (80, 136, 138, 134) for feeding the tape at a higher playback speed in the forward direction;
   3. normally de-activated high reverse speed drive means (80, 82, 102) for driving said tape in the opposite direction at a fast reverse speed substantially higher than said playback speed; and
   4. normally de-activated low reverse speed drive means (70, 82, 102) for driving said tape at a slow reverse speed substantially lower than said fast reverse speed; and
d. control means (S1, S2, S3, S4 and S5) for selectively activating one of said low forward speed, high forward speed, high reverse speed and low reverse speed drive means, respectively, whereby said transducer head means is operatively connectable with said audio output system at least while said tape drive means is operated to feed the tape either at said slow reverse speed or said forward playback speed, said tape being continuously guided along a path adjacent said transducer head means for the pickup of signals from the same track on the tape, whereby said audio output system can reproduce said signals as sound regardless of the speed or direction of travel of said tape.

2. Apparatus as defined in claim 1, wherein said drive means includes continuously driven low (76) and high (80) speed driving wheels, said control means including means electrically responsive to selective electrical signals to couple said driving wheels with said reels to drive said tape at the low and high speeds in the forward and reverse directions, respectively.

3. Apparatus according to claim 2 wherein said tape drive means includes a capstan for engaging and driving the tape, and said electrically responsive means is responsive to said selective signals to cause or permit the tape to engage said capstan drivingly only while said tape drive means is operated to feed the tape at said playback speed.

4. Apparatus according to claim 3, wherein first and second ones of said drive wheels are adapted and arranged to engage respective ones of said reels to drive the reels in respective directions, said electrically responsive means being responsive to said selective electrical signals to cause or permit either said first or said second drive wheel to engage drivingly the respective reel when feeding the tape in the forward or reverse directions respectively.

5. Apparatus according to claim 1 wherein said slow reverse speed is at least as high as said playback speed and not higher than three times said playback speed.

6. Tape playback apparatus for use in connection with a length of tape having sound recorded thereon and the ends of which are wound upon a pair of reels, respectively, comprising a. tape deck means (10) for rotatably supporting said reels and for guiding the tape therebetween;
b. capstan means for feeding said tape between said reels, said capstan means including a continuously driven capstan (70) rotatably connected with said tape deck on one side of said tape adjacent the path of travel thereof between said reels, and pinch roll means arranged on the other side of said tape for normally pressing said tape against said capstan;
c. pinch roll disengaging means (40) for normally maintaining said pinch roll means in an inoperative position relative to said capstan;
d. transducer head means (18) supported on said tape deck adjacent said tape for connection with an audio output system to produce sound in response to signals detected on said tape;
e. continuously driven low and high speed, driving wheels (76, 80) rotatably supported by said tape deck, respectively;
f. a pair of forward and reverse reel drive wheels (22, 24) connected with said tape deck for movement between normally disengaged and reel-driving positions relative to said reels, respectively;
g. selectively operable first solenoid means (S4) for displacing said forward reel drive wheel into driving engagement with the corresponding tape reel and for effecting driving connection between said forward reel drive wheel and said low speed driving wheel;
h. selectively operable second solenoid means (S2) for displacing said reverse reel drive wheel into driving engagement with the corresponding tape reel and for effecting driving connection between said reverse reel drive wheel and said low speed driving wheel;
i. selectively operable third solenoid means (S3) for displacing said forward reel drive wheel into driving engagement with the corresponding tape reel and for effecting driving connection between said forward reel drive wheel and said high speed driving wheel;
j. selectively operable fourth solenoid means (S1, S2) for displacing said reverse reel drive wheel into driving engagement with the corresponding tape reel and for effecting driving connection between said reverse reel drive wheel and said high speed driving wheel; and k. means (40) operable solely by said first solenoid means only when said forward reel drive wheel is in driving engagement with the corresponding reel and is driven by said low speed driving wheel for deactivating said pinch roll disengaging means to effect tape driving cooperation between said pinch roll and said capstan.

7. Apparatus as defined in claim 6, and further including brake means (184) for normally resisting rotational movement of said tape reels, and fifth solenoid means (S5, S3) for releasing said brake means.

* * * * *